Patented Oct. 10, 1939

2,175,370

UNITED STATES PATENT OFFICE 2,175,370

AZO DYESTUFFS

Frithjof Zwilgmeyer, Arden, Del., assignor to E. I. du Pont de Nemours & Company, Wilmington, Del., a corporation of Delaware No Drawing. Application July 2, 1937, Serial No. 151,669

8 Claims. (Cl. 260—193)

This invention relates to azo dyestuffs, and especially to the ice colors obtained by coupling ice color bases to a coupling component which is represented by the formula

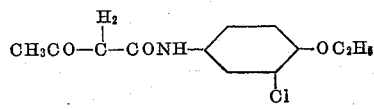

to fibres dyed with the dyes, to compositions containing the coupling component and to methods of making said compositions and dyeings.

It is among the general objects of this invention to provide for dyeing textile fibres, especially cotton and regenerated cellulose with new dyes. Another object of the invention is to provide dyes in shades of yellow which have outstanding fastness to the exposures encountered by dyed textiles, particularly fastness to washing. Another object of the invention is to provide new printing compositions. Still other objects of the invention will be apparent from the following description.

The objects of this invention are attained generally by applying the usual ice color processes, for the developing of these new colors on the fiber. For example, textile fibers are impregnated with the above type coupling component and the impregnated goods is developed in diazo solutions produced in the usual manner from ice color bases. Alternatively the ice color bases may be used as their water soluble diazo imino derivatives or as anti-diazotates by the methods well known in the art. In this case the diazo imino compounds or anti-diazotates are mixed in alkaline medium with the coupling components, the textile fibers are impregnated with the mixtures by dyeing or printing, and the color is developed by treatment with weak acid. This color development may be carried out suitably by exposing the goods to the action of steam containing the vapors of acetic or formic acid.

The invention is illustrated by the following examples but it is to be understood that it is not limited thereto.

Example 1

A printing paste was prepared by mixing 2 parts of aceto-acetyl-3-chlor-4-ethoxy-aniline, 2 parts of the diazo-imino compound obtained from diazotized 2:5-dimethoxy aniline and diethanolamine, 28 parts of water, 3 parts of sodium hydroxide 30% solution, and 65 parts of starch tragacanth thickener.

The thickener consisted of 80 parts wheat starch, 360 parts gum tragacanth 6% solution, and 560 parts water.

Cotton and rayon piece goods were printed from an engraved roll with the above paste. The prints were dried in the air, and then subjected to the action of live steam containing the vapors of acetic acid in accordance with the methods of printing hereinbefore described.

A color development took place and the printed goods were rinsed with water, boiled for 5 minutes in a 0.5% soap solution, again rinsed, and dried. A bright reddish yellow dyeing of good washing fastness properties was obtained. The new color is represented by the formula:

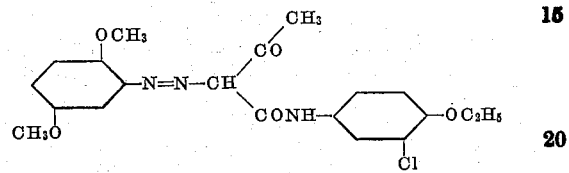

Example 2

A printing paste was prepared by mixing 1.6 parts of aceto-acetyl-3-chlor-4-ethoxy-aniline, 2.4 parts of the diazo imino compound obtained by reacting diazotized para-chlor-ortho-anisidine and methyl glucamine, 28 parts water, 3 parts sodium hydroxide 35% solution, and 65 parts starch-tragacanth thickener of the same composition as the thickener used in Example 1.

Cotton and rayon piece goods were printed and treated as in Example 1.

A bright greenish yellow dyeing of good fastness properties was obtained. The new color is represented by the formula:

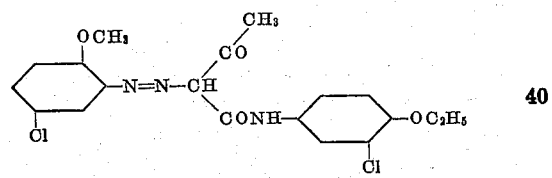

Example 3

A printing paste was prepared by mixing 1.6 parts of aceto-acetyl-3-chlor-4-ethoxy-aniline, 2.4 parts of the diazo imino compound obtained by reacting diazotized para-chlor-ortho-toluidine with diethanolamine, 28 parts water, 3 parts sodium hydroxide 35% solution, and 65 parts starch-tragacanth thickener of the same composition as the thickener used in Example 1.

Cotton and rayon piece goods were printed and treated as in Example 1.

A bright greenish yellow dyeing of good fastness properties was obtained. The new color is represented by the formula:

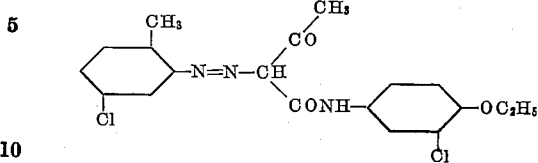

Example 4

A printing paste was prepared by mixing 1.9 parts of aceto-acetyl-3-chlor-4-ethoxy-aniline, 2.1 parts of the diazo-imino compound obtained by reacting diazotized cresidine with methyl-glucamine, 28 parts water, 3 parts sodium hydroxide 35% solution, and 65 parts starch-tragacanth thickener of the same composition as that used in Example 1.

Cotton and rayon piece goods were printed and treated as in Example 1.

A bright yellow dyeing of good fastness properties was obtained. The new color is represented by the formula:

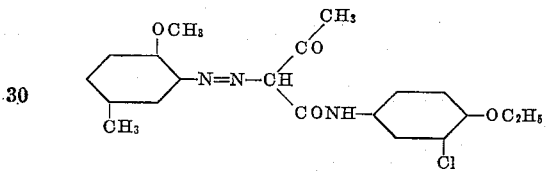

Example 5

A printing paste was prepared by mixing 1.8 parts of aceto-acetyl-3-chlor-4-ethoxy-aniline, 2.2 parts of the diazo-imino compound obtained by reacting diazotized 2:5-dimethoxy-aniline and methyl glucamine, 28 parts water, 3 parts sodium hydroxide 35% solution, and 65 parts starch-tragacanth thickener of the same composition as that used in Example 1.

Cotton and rayon piece goods were printed and treated as in Example 1.

A bright reddish yellow dyeing of good fastness properties was obtained. The new color is represented by the formula of Example 1.

Example 6

A paste was prepared by mixing 1.8 parts of aceto - acetyl - 3 - chlor - 4 - ethoxy - aniline, 2.2 parts of dried anti-diazotate of 2:5-dichlor-aniline, 28 parts water, 3 parts sodium hydroxide 35% solution and 65 parts starch-tragacanth thickener of the same composition as that used in Example 1.

Cotton and rayon piece goods were printed and treated as in Example 1. A yellow dyeing was obtained. The new color had excellent fastness and is represented by the formula:

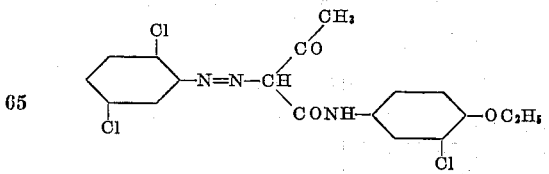

Example 7

A paste was prepared by mixing 1.8 parts of aceto-acetyl-3-chlor-4-ethoxy-aniline, 2.2 parts of the diazo-imino compound obtained by reacting diazotized aniline with methyl glucamine, 28 parts water, 3 parts sodium hydroxide 35% solution, and 65 parts starch-tragacanth thickener of the same composition as that used in Example 1.

Cotton and rayon piece goods were printed and treated as in Example 1.

A bright yellow dyeing of good fastness properties was obtained. The new color is represented by the formula:

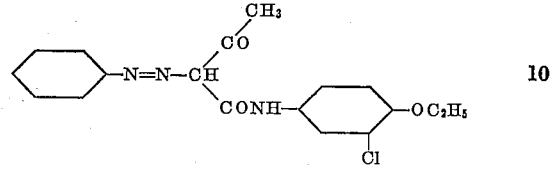

The above examples illustrate only a few of the many new azo dyes obtainable from the described coupling component. Any aryl amine free from water solubilizing groups may be diazotized and coupled with the above described coupling component in the form of a stabilized diazo, a nitrosamine, a diazoamino compound, a diazo salt or a diazo solution, the preparation of which compounds is understood by those skilled in the art. Among suitable amines other than those illustrated in the above examples are the following: 4-bromo-2-amino-anisole, 3-nitro-4-amino-toluene, 4-chloro-2-nitro-aniline, ortho-phenetidine-azo-alpha-naphthylamine, para - anisidine-azo-2:5-dimethoxy-aniline, alpha-amino-anthraquinone, 3-amino-carbazole, dianisidine, para-amino-diphenyl, 4:4'-diamino-diphenylamine, 1-amino-2-methoxy-naphthalene, but many others can be used.

The dyeings of the shades of yellow produced in accordance with the invention have good fastness to the exposures encountered by dyed textiles. The washing fastness of the dyeings is outstanding. The dyeings produced by the combination of the coupling component with diazotized anilines substituted by chlorine and another substituent have outstanding brightness and fastness to washing and are preferred.

It will be evident to those skilled in the art that other alkalis, such as the alkali metal hydroxides and carbonates can be used instead of sodium hydroxide in printing pastes and other stabilized compositions.

The colors may be applied by any of the processes for the application of ice colors. These are well known in the art but they find their most important use in printing according to which alkaline compositions containing the stabilized diazo component and the coupling components is printed on the fibre and developed by hydrolysis of the diazo imino compound.

The following methods of imparting the colors to the fibres are mentioned.

1. The fibres are padded with the arylamide and then immersed in a solution of diazotized aryl amine.

2. The fibres are impregnated with the arylamide and printed with pastes containing the diazotized aryl amine.

3. The diazotized aryl amine is converted to its anti-diazotate (nitrosamine) and the fibres are printed with pastes containing the antidiazotate and the arylamide. The color is then developed by treatment with a mild acid, desirably at an elevated temperature.

4. The diazotized aryl amine is reacted with one of various aliphatic, isocyclic or heterocyclic amines which desirably contains a water solubilizing group and a diazo imino derivative is formed. The fibre to be dyed is printed with a paste containing the diazo imino derivative and the arylamide. The color is then developed by hydrolyzing the diazo imino compound, such as by acting upon the printed goods with an acid, whereupon the coupling is immediately effected.

Among the desirable stabilizing agents are, methyl glucamine, diethanolamine, sarcosine, ethyl taurine, proline and 4-sulfo-2-amino-benzoic acid. The rate of color development will vary among the different derivates of the stabilizing agents but for a given stabilizing agent, it has been found that the rapidity of development of the diazo imino compounds is rapid.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

1. A compound represented by the formula

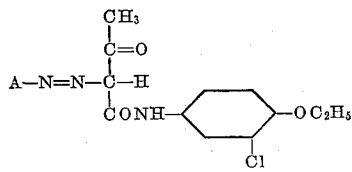

in which A is the residue after diazotization of a primary aryl amine which is devoid of a water solubilizing group.

2. The compound represented by the formula

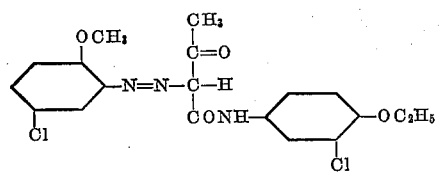

3. The compound represented by the formula

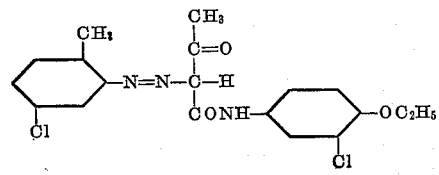

4. The compound represented by the formula

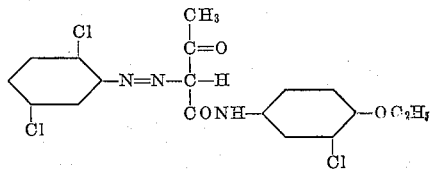

5. Cellulosic textile fibres dyed with a dye represented by the formula

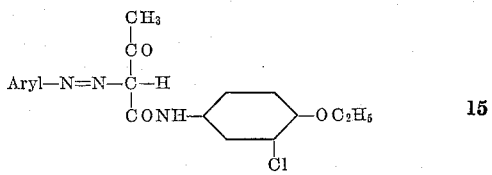

in which Aryl is the radical of a primary aryl amine which is free from water solubilizing groups.

6. Cellulosic textile fibres dyed with the compound represented by the formula

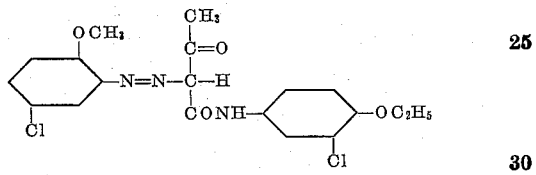

7. Cellulosic textile fibres dyed with the compound represented by the formula

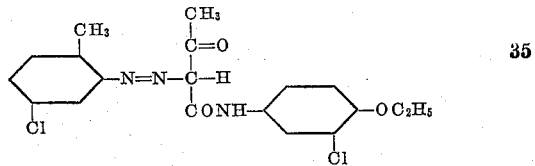

8. Cellulosic textile fibre dyed with the compound represented by the formula

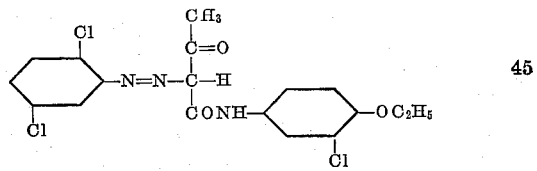

FRITHJOF ZWILGMEYER.